(12) United States Patent  (10) Patent No.: US 8,202,012 B2
Stewart et al.  (45) Date of Patent: Jun. 19, 2012

(54) ELECTRO-OPTICAL CONNECTOR AND METHODS FOR ALIGNING

(75) Inventors: Duncan Stewart, Menlo Park, CA (US); Paul Rosenberg, Sunnyvale, CA (US); Michael Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 876 days.

(21) Appl. No.: 12/263,352

(22) Filed: Oct. 31, 2008

(65) Prior Publication Data

US 2010/0027941 A1 Feb. 4, 2010

Related U.S. Application Data

(60) Provisional application No. 61/085,331, filed on Jul. 31, 2008.

(51) Int. Cl.
*G02B 6/42* (2006.01)
(52) U.S. Cl. .............................. 385/88; 385/89
(58) Field of Classification Search .................. None
See application file for complete search history.

(56) References Cited

U.S. PATENT DOCUMENTS

| | | | | |
|---|---|---|---|---|
| 4,690,495 A | * | 9/1987 | Giannini | 385/57 |
| 5,134,679 A | * | 7/1992 | Robin et al. | 385/90 |
| 5,647,043 A | * | 7/1997 | Anderson et al. | 385/78 |
| 6,318,901 B1 | * | 11/2001 | Heremans et al. | 385/53 |
| 6,452,705 B1 | | 9/2002 | Paxton | |
| 6,616,342 B2 | * | 9/2003 | Kiani | 385/54 |
| 7,101,188 B1 | | 9/2006 | Summers | |
| 7,213,974 B2 | * | 5/2007 | Kiani et al. | 385/58 |
| 2002/0118926 A1 | * | 8/2002 | Shimoji et al. | 385/76 |
| 2002/0186931 A1 | * | 12/2002 | Seo et al. | 385/60 |
| 2003/0044125 A1 | * | 3/2003 | Kiani et al. | 385/78 |
| 2005/0078902 A1 | | 4/2005 | Beausoleil | |
| 2006/0067627 A1 | * | 3/2006 | Crews et al. | 385/59 |
| 2006/0093273 A1 | * | 5/2006 | Fenwick et al. | 385/57 |
| 2006/0177184 A1 | * | 8/2006 | Basavanhally et al. | 385/89 |

* cited by examiner

*Primary Examiner* — Mike Stahl

(57) ABSTRACT

An electro-optical connector including a first connector end and a second connector end. The first connector end is coupled to a first electro-optical device. The second connector end coupled to a second electro-optical device. The second connector is flexibly coupled to a connector base so a second connector face can move flexibly with respect to a first connector face. A force mechanism on at least one connector end applies a force on an interface between the first connector end and the second connector end. The force is applied when the first connector face is within a predefined proximity of the second connector face. A mechanical guide on the connector end can align the first connector face with the second connector face when the force mechanism applies the force. The connector end for the force mechanism or the mechanical guide can be the first connector end or the second connector end.

21 Claims, 8 Drawing Sheets

ELECTRO-OPTICAL CONNECTOR AND METHODS FOR ALIGNING

CROSS-REFERENCE TO RELATED APPLICATION

The present application claims priority from provisional application Ser. No. 61/085,331, filed Jul. 31, 2008, the contents of which are incorporated herein by reference in their entirety.

BACKGROUND

Interconnects are used between components and devices on printed circuit boards (PCBs) allowing components and devices to communicate with each other as part of a larger computer system. PCBs are often stacked together on edge as computer cards or blades connected to a computer chassis to provide a greater density within a limited space.

Interconnects allow devices in a computer system to communicate directly with each other using electrical or optical signals. Often high speed electrical and optical interconnects use bulky and expensive cabling. Due to the precise alignment desired, high speed interconnects are generally manually connected in an operation separate from the insertion of installation of the PCB board.

DETAILED DESCRIPTION OF EXAMPLE EMBODIMENTS

Figure 1:
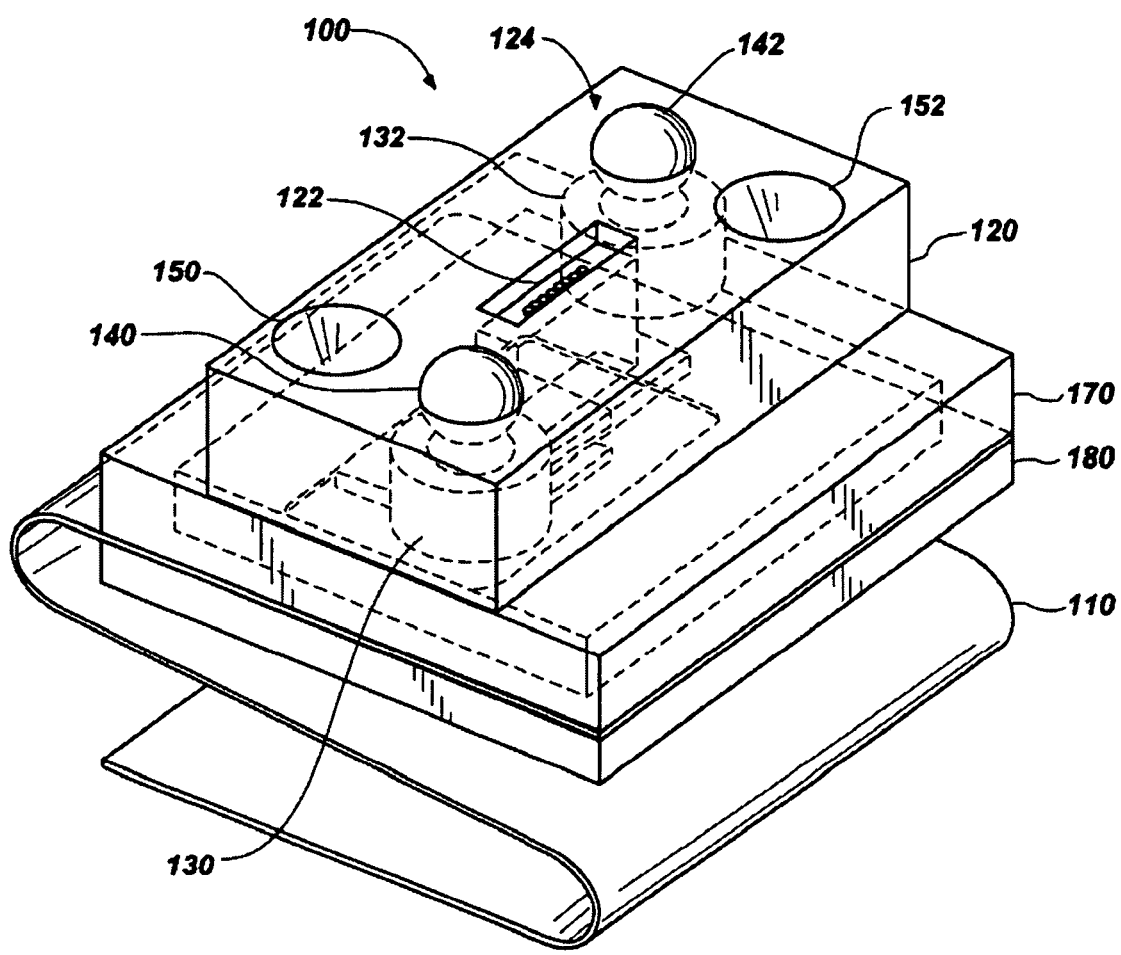
FIG. 1 is a perspective view illustrating an electro-optical connector end in accordance with an embodiment.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Optical-electrical (OE) or electro-optical interconnects (connectors) are used to connect printed circuit boards (PCBs) and circuits on the PCBs together. Manually attaching OE interconnect may be time consuming and require bulky and expensive electrical or optical cabling. The OE interconnect may couple electro-optical devices together. OE devices may include electrical devices, optical devices, or devices using both electrical and optical signals for internal circuit operation or inter-chip communication.

The OE connector (connector or OE interconnect) may include two ends that when aligned provide an OE connection between at least two OE devices. As illustrated in FIG. 1, the combination of the OE device with an OE connector end may be called a module 100.

When the two modules move into close proximity to each other, a force may be generated by a force mechanism associated with one or both modules. As the modules come into proximity and the force mechanism moves the modules together, the components on the module may move, rotate, or slide with components on the other module during and after the alignment of the modules to each other. As the modules engage, guide elements may bring electrical and optical elements and contacts of the module used in board-to-board or circuit-to-circuit communication into precise alignment. Precise alignment enables data signaling to be accomplished by optical signals, or through direct electrical transmission.

The connector may be called a self-aligning proximity connector because the alignment may be automatic when two mating ends of the connector come within proximity to each other. The connector may also be referred to as a passively self-aligned optical blind-mate connector, because the connector alignment occurs with another force that may not be directly applied to the connector.

FIG. 1 illustrates a module 100. An integrated circuit (IC or OE device) may be attached to a media base 180. The media base may include a metal, like copper (Cu), or use PCB material. The media base may be a thermal conductor and may be used as a heat sink to dissipate heat generated by the circuit. The media base may be used to provide electrical conductivity for circuit contacts. The media base may include wave guides or optical fibers and may be configured to propagate optical signals. An OE array may be used by the OE device to communicate with other OE devices. The OE array may use optical or electrical signals for communication. The OE array may be coupled directly to the OE device or the OE array may be coupled to the media base with the media base providing optical or electrical connectivity between the OE device and the OE array.

The media base 180 may be connected to a flexible mechanism 110. The flexible mechanism may be a leaf spring, an air spring, or other mechanical spring. The flexible mechanism may be flexible in all axes of motion and may allow the OE device to move in the X, Y, and Z axes relative to the plane of the media base. The flexible mechanism allows the lateral, rotational, tilt movement when the OE device is being coupled to another OE device. The flexible mechanism may allow up to 10 degrees tilt and rotation in all axes. The flexible mechanism may contain an opening to allow the OE device to protrude through the top plane (plane furthest from the PCB board) of the flexible mechanism. The flexible mechanism may be mechanically coupled to the OE device by the media base. The flexible mechanism may be a PCB element, such as a flexible printed circuit, in which electrical traces are fabricated.

An array extender 122 may be placed over the OE array to provide an interface with another OE array or extender to an OE array. The extender may be configured to conduct, transmit, or propagate electrical or optical signals. The extender may be passively or actively aligned to the OE array or may use vision aided alignment. Passive alignment may use reference mechanical features, such as bumps and ridges in the OE array and corresponding features in the extender to align the extender. Active alignment may power on the OE device and transmit (or receive) optical or electrical signals using the OE array. Measuring and/or alignment equipment may be used to monitor the signals and signal intensity and move the extender relative to the OE array. Measuring and/or alignment equipment may include processors, motors, and cameras. Vision aided alignment may use a camera for pattern recognition or may use a camera to view fiducial marks or shape that are used to align the OE array to the extender.

A cover 170 may be used to protect the OE device, OE array, or fasten the extender 122 to the flexible mechanism 110 or OE array. The cover may be coupled to the flexible mechanism, the OE device, or the media base. The extender and cover may be separate structures or included in the same structure. The alignment mechanism used to align the extender may be used to align the cover or the cover may be automatically aligned when the extender is aligned.

An alignment module 120 may be mechanically attached to the cover 170 and the extender 122. The extender may protrude through an opening in the alignment module. The alignment module may be aligned with the extender and the OE array by the opening in the alignment module fitted for the extender. The alignment mechanisms used to align the extender may also be used to align the alignment module to the cover. The cover, extender, and alignment module may be formed from insulating materials. The insulating materials may be injection molded or base-molded plastic. The base-molded plastic may be at least 70% glass filled.

Figure 2:
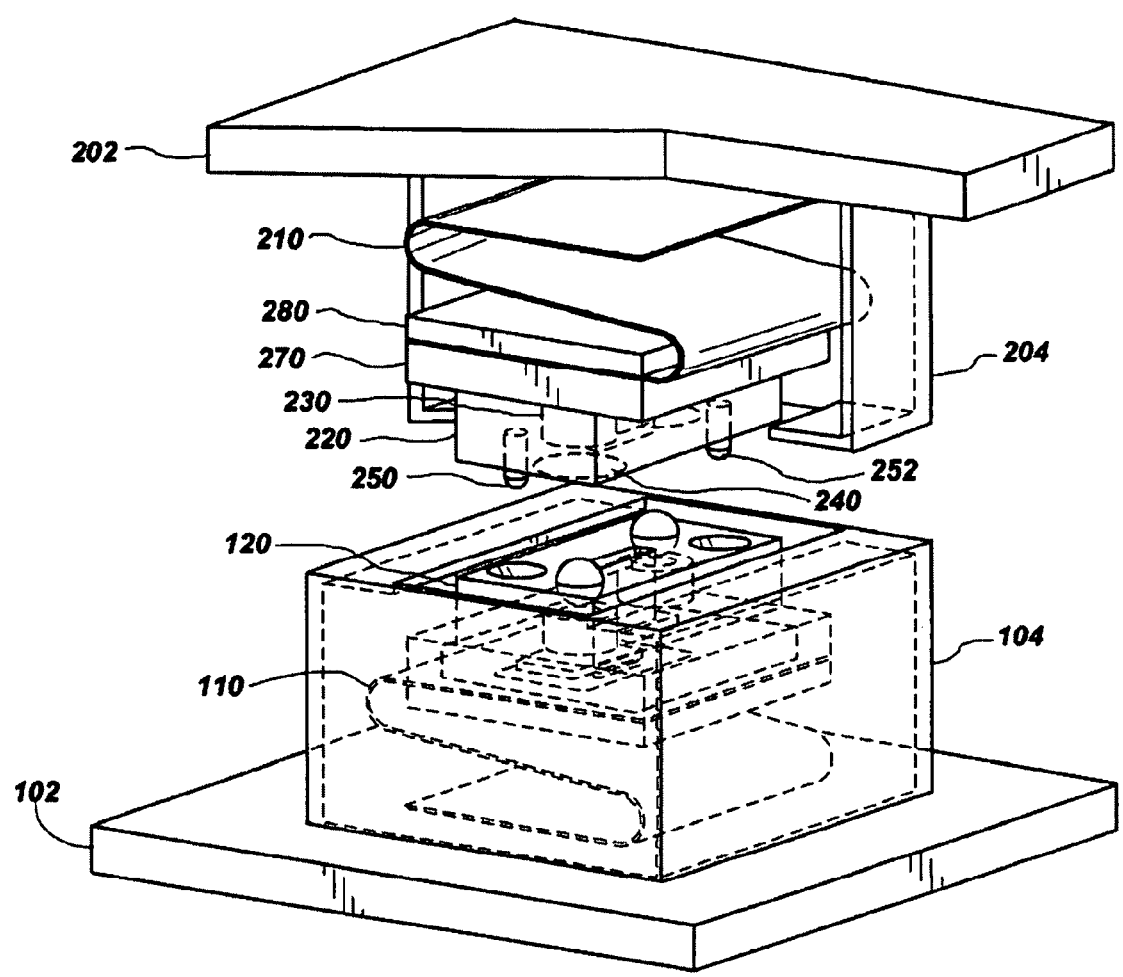
FIG. 2 is a perspective view illustrating elector-optical connector ends coupled to printed circuit boards in accordance with an embodiment.

The connector may have similar features on each of the connector's mating ends and PCB board connections, as shown in FIG. 2. A flexible media element 110, a media base 180, a cover 170 may be included on a first connector end and the first PCB board 102. A flexible media element 210, a media base 280, a cover 270 may be included on a second connector end and the second PCB board 202. The module or connector end may be covered or protected with a shroud, covering, or case 104 and 204. Each module or connector end may be coupled to a substrate or printed circuit board (PCB) 102 and 202; the first OE device may be coupled to a first PCB and a second OE device may be coupled to a second PCB. The connection to the PCB may be called a connector base. The modules may be coupled to the PCB by the flexible mechanism 110 and 210.

A pair of modules 100 (FIG. 1) can attach to two separate printed circuit boards or computer cards that can be fixtured to a blade type of computer chassis. The connector, including mating ends, may provide precise alignment and connection between two modules (OE devices) that communicate via electrical or optical signaling when the PCB blades are inserted into the chassis.

Referring again to FIG. 2, the alignment module 120 may have a corresponding mate (alignment module mate) 220 that interfaces with the alignment module. The alignment module may align with the alignment module mate when a force is applied to the alignment module (or alignment module mate) so an alignment module face 124 (FIG. 1) is in contact with and in proximity to a face of the alignment module mate (corresponding alignment module).

The alignment module 120 may be included in a first connector end. The alignment module mate 220 may be included in a second connector end. A second connector end may be included in a base module mate.

The alignment module 120 may include a force mechanism and a mechanical guide. The force mechanism may include a magnet, an air spring, a leaf spring, a mechanical spring, or similar structure. The mechanical guide may include a spherical structure, a rod, a pin, a taper, or a datum. The tapers may be spherical or cone-shaped. The spherical structure may be called a precision sphere. The guide may refer just to the feature or structure on a connector end, or the guide may refer to the feature or structure on a connector end and its corresponding feature or structure on the mating connector end. For example, the mechanical guide may refer to a datum, or the guide may refer to a spherical structure and its corresponding taper. The mechanical guides allow a substantial portion of the faces of the alignment module and its mate to come into contact with each to form an alignment interface.

Figure 3:
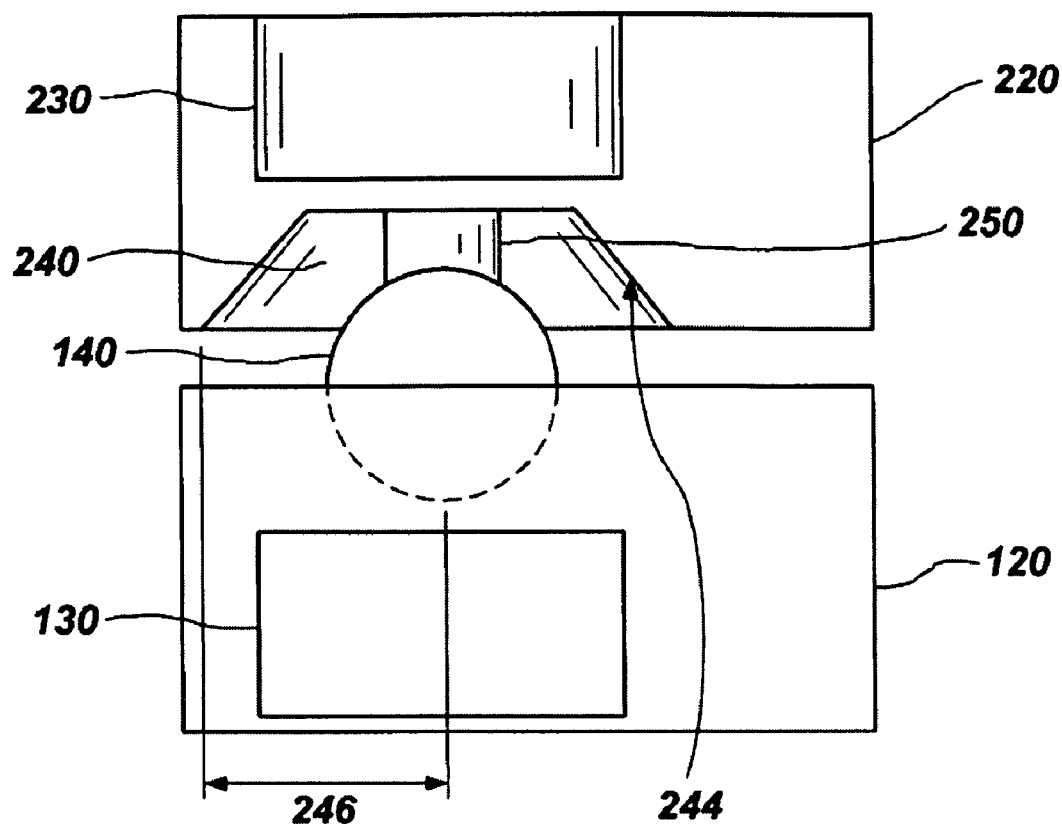
FIG. 3 is a sectional side view illustrating electro-optical connector ends with a rough alignment guide in accordance with an embodiment.
Figure 4:
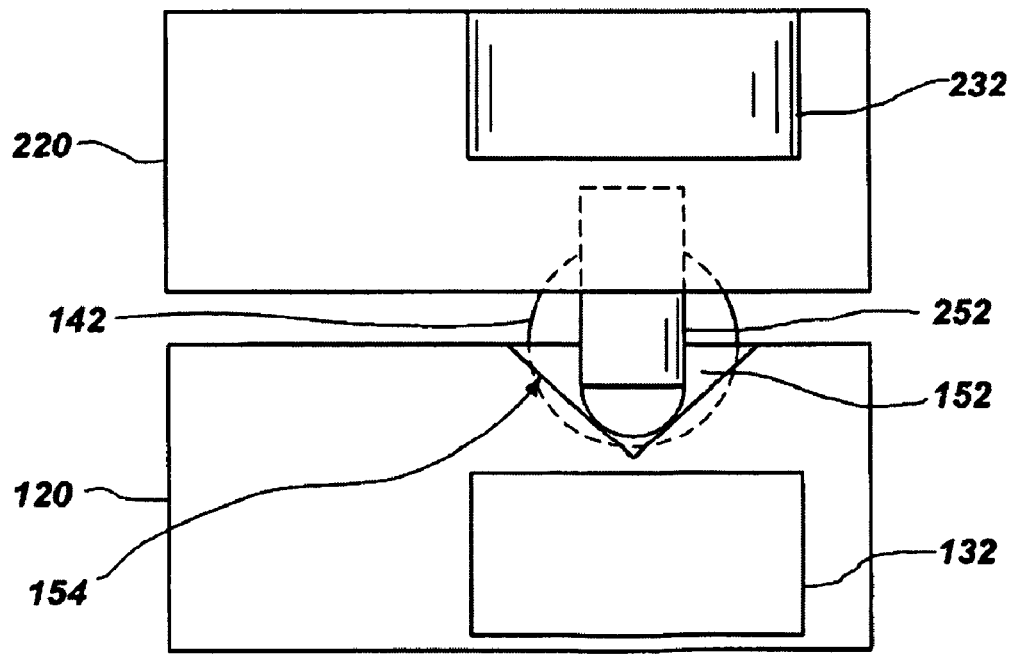
FIG. 4 is a sectional side view illustrating electro-optical connector ends with a fine alignment guide in accordance with an embodiment.

As shown in FIGS. 2-4, the mechanical guide may include a rough alignment guide 140, 142, and 240 and a fine alignment guide 150, 152, 250, and 252. The rough alignment guide moves the alignment module relative to the corresponding alignment module when the faces are within a predetermined distance or proximity of the final alignment position. The rough alignment guide positions the alignment module and its mate so the fine alignment guide on the alignment module is within range of the corresponding fine alignment guide feature on the corresponding alignment module mate. The rough alignment guide may provide general interface alignment of the faces of the connector ends. The fine alignment guide more precisely aligns the contacts or channels of one end of the electro-optical connector to the mating end.

The rough alignment guide may use a spherical structure 140 that seats within a taper 240 in the mating alignment module. Proximity to a final alignment position may be determined by the distance 246 of the peak of the spherical structure protrusion 140 from the alignment module and the edge of the taper 244 in the alignment module mate, as shown in FIG. 3. A force on the faces of the alignment module and mate, which are within the appropriate proximity will push the spherical structure into the taper. The alignment module, the alignment module mate, or both will move into a final alignment position with the movement of the spherical structure into the taper. The proximity distance 246 may be defined as the radius of the rough alignment guide taper, so when the peak of the spherical structure is within the proximity distance, the faces of the connector ends will move into an aligned position. The proximity distance may be 2 mm.

The fine alignment guide may provide greater precision for the alignment than the rough alignment guide. The fine alignment guide may use a rod 250 and 252 that seats within a cone-shaped taper 150 and 152 in the mating alignment module 120. The rough alignment guide may position the peak of the rod to be within the area of the cone-shaped taper. With a force on the rod within the taper, the rod may slide down the edge 154 of the taper until the peak, end, or point of the rod is seated at the point of the taper, as shown in FIG. 4. When the rod is seated at the point of the taper, the alignment module and mate may be precisely aligned so the contacts or channels of each end of the electro-optical connector are enabled to propagate electrical or optical signal through the connector. The protrusion of the rough alignment guide may extend further from the surface or face 124 than the fine alignment guide, so the rough alignment guide may move the alignment module 220 or its mate before the fine alignment guide touches the corresponding feature on the mating face. The taper 240 diameter of the rough alignment guide may be larger than the taper 150 and 152 of the fine alignment guide, so the features of the rough alignment guide will operate on the alignment module pair before the fine alignment moves or aligns the pair.

The mechanical guide may be combined with the magnetic force mechanism. The spherical structure of the rough alignment guide may include a ferromagnetic material, a ferrimagnetic material, a ferrous material, or a metal. Magnets 130, 132, 230, and 232 may be placed within the alignment module under the spherical structure 140 and 142 or rod 250 and 252 and corresponding taper 150, 152, and 240 on the alignment module mate. The attractive force of the magnets may provide the force to pull the spherical structure or rod into the taper. A single magnet under the taper may provide the force to pull the spherical structure or rod to the taper. The spherical structure or rod may be ferromagnetic and magnetized by the magnets.

The mechanical guide may include at least two pairs of rough alignment features, or at least two pairs of fine alignment features, or both. The two pair of features may rotatably align one alignment module face with the face of the corresponding alignment module.

The flexible mechanism, the force mechanism, and mechanical guide may be in the module (the first module or first connector end) or in a corresponding or mating module (the second module or second connector end). The flexible mechanism may be in one or both modules so long as at least one module includes a flexible mechanism. The force mechanism may be in one or both modules so long as at least one module includes a force mechanism. The alignment guide may be in one or both modules so long as at least one module includes an alignment guide.

Figure 5:
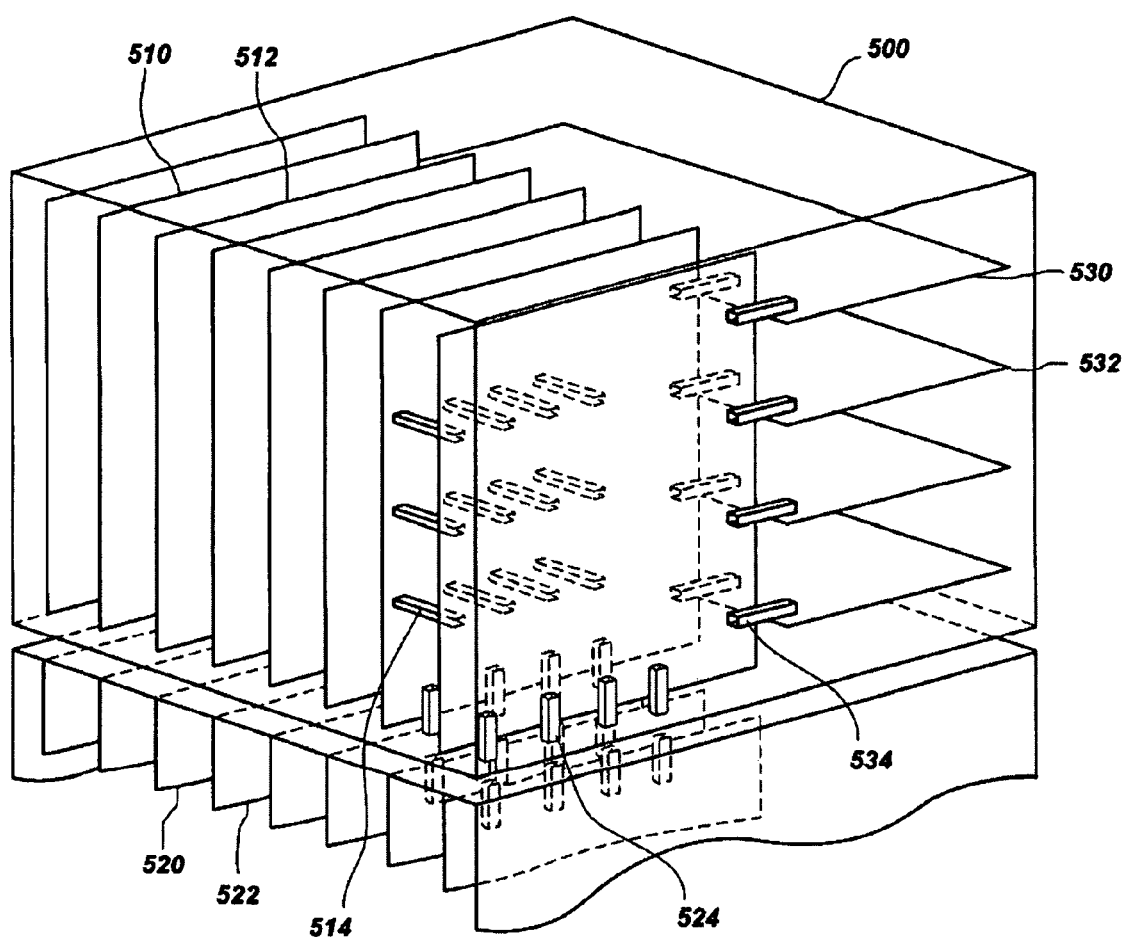
FIG. 5 is a perspective view illustrating printed circuit boards coupled on a chassis in accordance with an embodiment.

The PCBs may be attached to a chassis 500 in a horizontal 530 and 532 or vertical 510, 512, 520, and 522 configuration, as shown in FIG. 5. Support or attachment of the PCBs to the chassis may be provided by sheet metal slots or notches in the chassis, and a retention force of electrical connectors Qn an edge of the PCBs blade coupled to the chassis. The support may be used to provide stability, support, and uniform distance between PCBs in a chassis or to attach PCBs together. The PCBs blades may be parallel to each other. The insertion of a PCB blade can place the face of the alignment module within the proximity of the face the corresponding alignment module positioned on the chassis, so the force mechanism, flexible mechanism, and mechanical guides may align the OE connector. The connector 514 may be normal to the face of the PCBs or the connector 524 and 534 may be normal to an edge of the PCBs. Connectors may provide board-to-board, PCB-to-PCB, or inter-chip communication.

The combination of the flexible mechanism and the force mechanism may form a compliance mechanism or compliant mechanism. The flexible mechanism and force mechanism may be combined into a single mechanical element. The compliant mechanism may include a leaf spring or air spring. The compliant media unit may include a compliant mechanism and an OE device. The compliant media unit may be a flexible printed circuit (flex), a flexible printed circuit optical wave guide, an integrated circuit (IC) attached to a flexible mechanism, or similar structure. The module 100 (FIG. 1) may include a compliant media unit.

Figure 6:
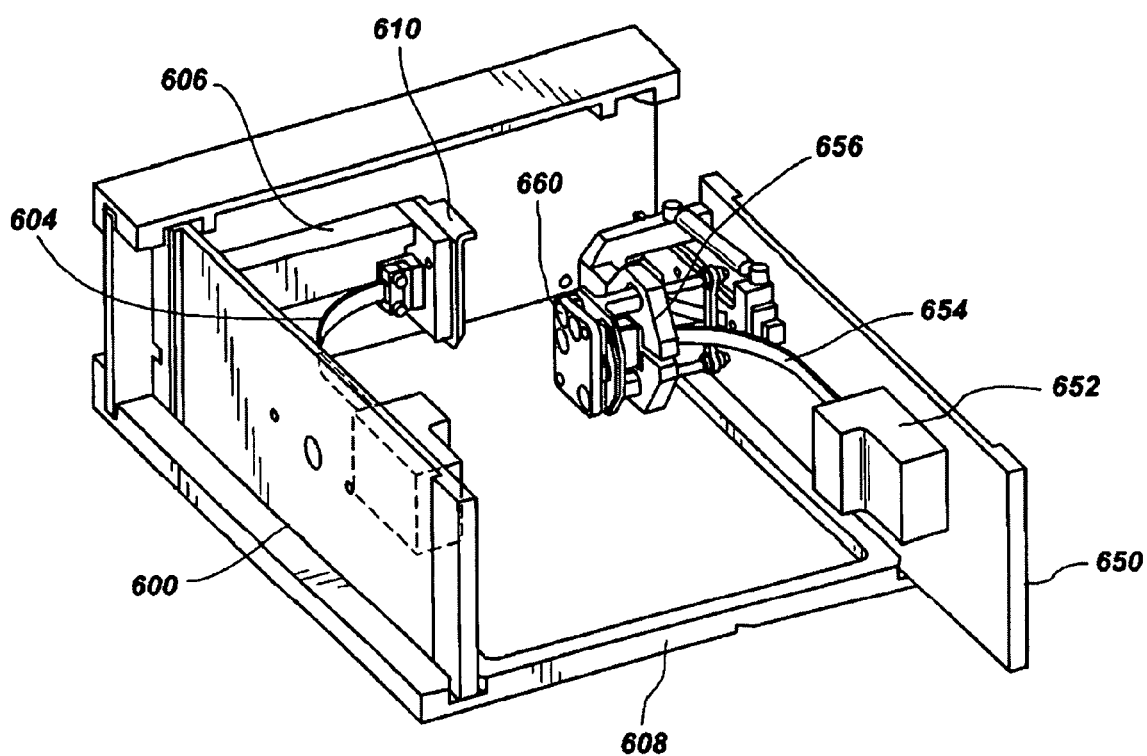
FIG. 6 is a perspective view illustrating electro-optical connector ends coupled to printed circuit boards on a chassis in accordance with an embodiment.
Figure 7:
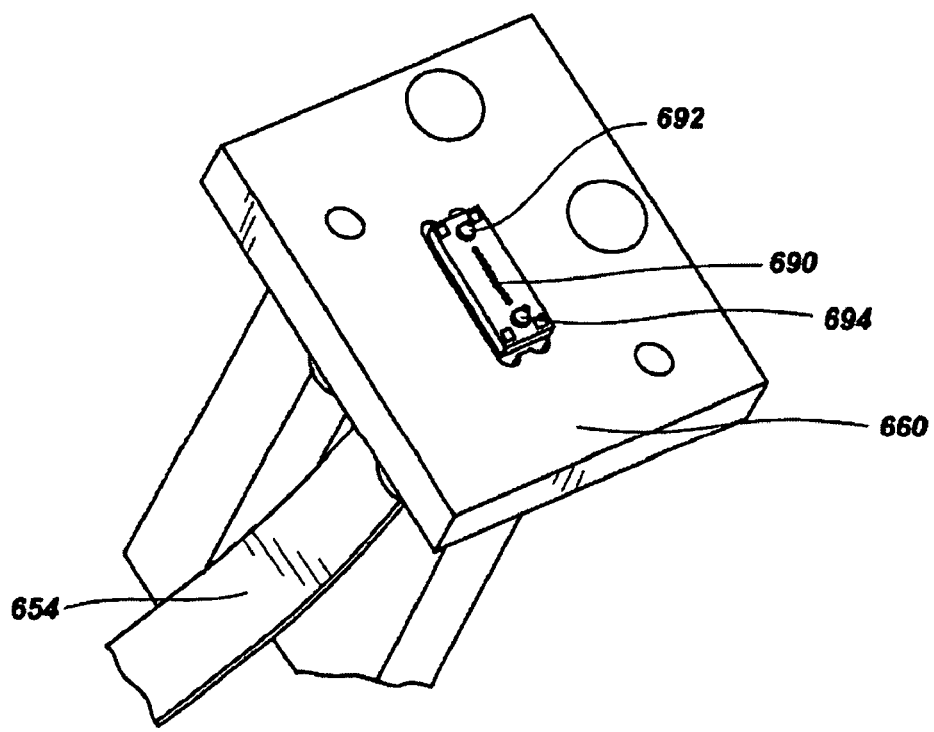
FIG. 7 is a perspective view illustrating an electro-optical connector end in accordance with an embodiment.

In another embodiment, a first module 604, 606, and 610 (FIG. 6) including an OE device may be attached to a first PCB 600 (FIG. 6) and may be loaded into a computer chassis 608 (FIG. 6). The first PCB's module may be the OE device and a connector end. A second module 652, 654, 656, and 660 (FIG. 6) may be attached to a second PCB 650 (FIG. 6). When the second PCB is loaded or pressed into the chassis, the magnets or a force mechanism in the two modules may pull flexible components in the module toward each other.

As the modules move together, a combination of guide spheres 140 and 142 (FIG. 1) and pins 250 and 252 (FIG. 2) may begin to engage mating negatively shaped features such as tapered holes 150, 152 (FIGS. 1) and 240 (FIG. 2). Mating features are designed so that when the relative motion of the two modules stop, precise alignment is achieved between electrical and optical elements on the respective modules. Electrical and optical elements can include lenses, wave guides, electrically conducting contacts, or similar structures. With alignment between the modules, high bandwidth signaling between the two units can be performed. When removing one or both PCBs to which the modules are attached, the alignment features may release with the application of force normal to the axis of the guide pins used to release the PCBs from the chassis. The first and the second connector ends detach from each other with a lateral force on the first and the second connector ends substantially parallel to the plane of the first substrate and the second substrate.

Figure 8:
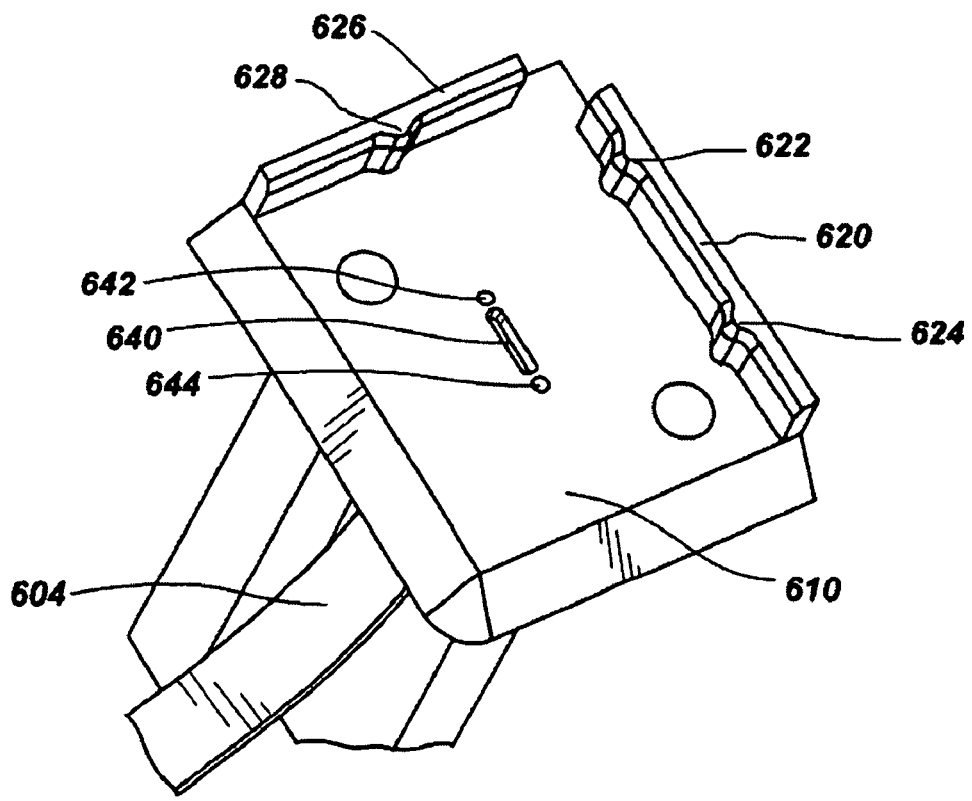
FIG. 8 is a perspective view illustrating an electro-optical connector end with datums in accordance with an embodiment.
Figure 9:
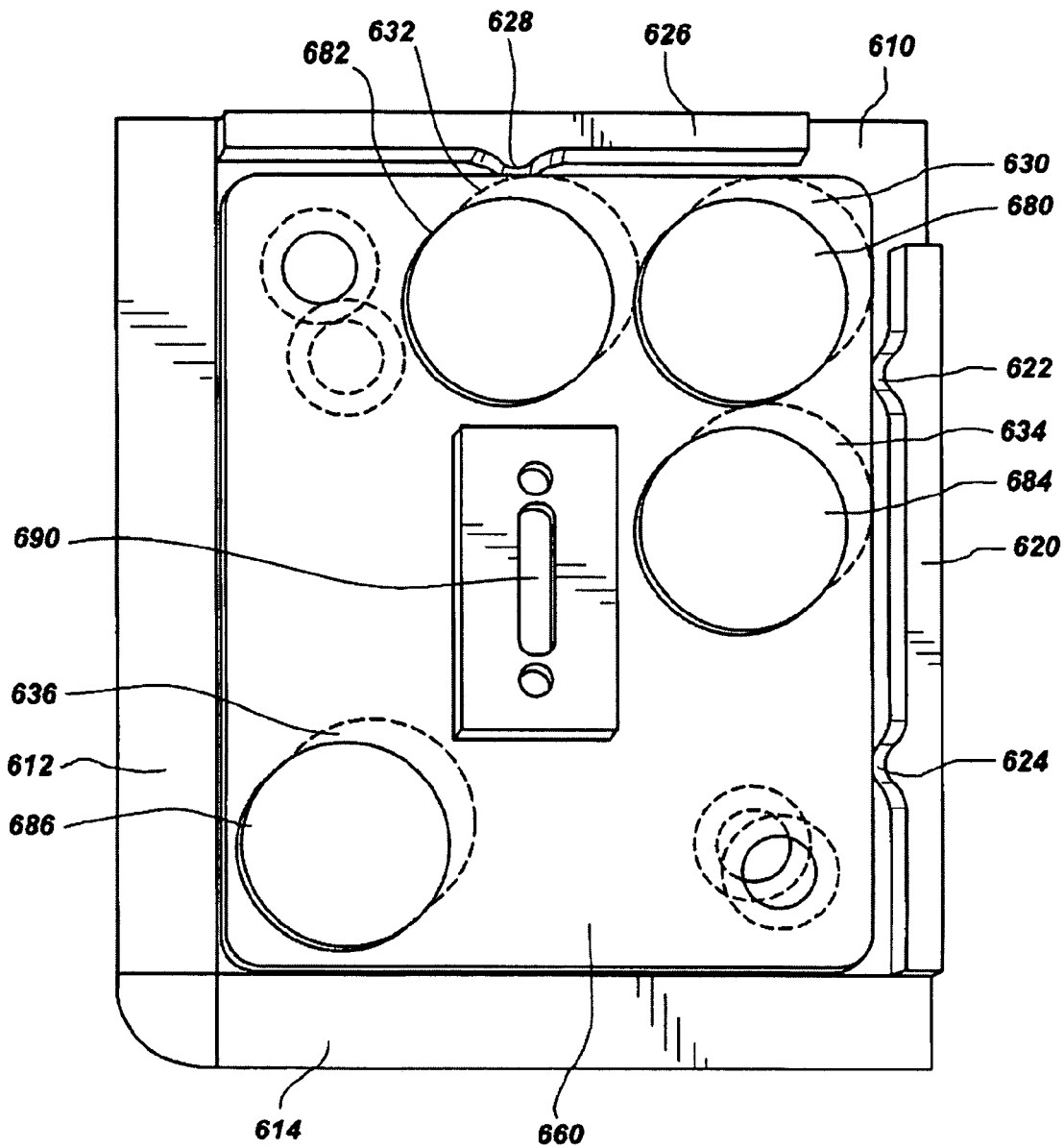
FIG. 9 is a perspective view illustrating an interface of electro-optical connector ends in accordance with an embodiment.

In another embodiment as depicted in FIG. 6, datums 622, 624, and 628 (FIG. 8) may be used to align the face 610 of a connector end (a first connector end) to the face 660 of another connector end (a second connector end). A datum is any surface, line, or point used as a reference. At least three datums may provide rotational alignment for the interface of the two connector end faces. As shown in FIGS. 8-9, the datums may protrude from the face of a connector end. The datums may be on the first connector face. Two datums 622 and 624 may be on one edge 620 while another datum 626 may be on an adjacent edge 628. Inherently, the plane of the first connector end face 610 provides another alignment datum for the second connector end face 660 in the direction normal to the plane. The other edges 612 and 614 of the first connector end may be tapered to allow the corresponding second connector end face to slide on the first connector end face when the ends are within proximity of each other. When two edges of the second connector end contact the datums of the first connector, the connector is aligned. The optical and electrical features 640 and 690 of connector may align automatically when a PCB blade 650 is installed in a chassis 608, as shown in FIGS. 6-9. Pins or rods 692 and 694 on one connector face may be seated in tapers 642 and 644 within the corresponding face to provide further alignment.

A flexible ribbon cable, fiber ribbon, or flexible electrical cable 604 and 654 may provide an electrical or optical path between the OE device and a connector face, so the OE device 652 is fixed to the PCB 650. Opto-electronic components, such as a laser array, photodetector array, or similar optical and electrical components may be coupled to the connector end face 660 and the flexible cable. An air spring or leaf spring may provide some of the force mechanism and flexible mechanism (compliant mechanism) to the connector. One end of the connector may be fixed 606.

Magnets may be within one of the connector ends with a magnet or ferromagnetic material in the corresponding connector end. The pattern formed by the magnets 630, 632, 634, and 636 on one side of the connector may be offset from the pattern formed by the magnets 680, 682, 684, and 686 or ferromagnetic material on the mating connector providing a residual force that pulls the mating surfaces of the second connector 660 against the datum points 622, 624, and 628 on the first connector 610 thereby maintaining proper positions of the mating connector halves and associated OE elements.

Using a self-aligning proximity connector provides high speed interconnects without the use of bulky and expensive electrical or optical cabling, and thus, eliminating expensive electrical and optical cables. High bandwidth can be achieved in a relatively small volume and footprint on a PCB. The connector also allows the interconnection to align and connect with the insertion of a PCB blade into a computer chassis and detach with the removal of the PCB blade from the chassis. The interconnection can be independent of the direction of blade motion into and out of the computer chassis. In addition the connector provides alignment and connection with an externally or manually applied force on the PCB blade that is perpendicular or oblique to the direction of the force within the connector. Thus, modules can communicate in any direction, because engagement can be normal to the typical PCB mounting surfaces or normal to any edges of the PCB. This mechanism is unlike most connectors currently used in computers which provide the engagement of metal pins into receptacles along an axis parallel to the direction of blade motion, so the connecting force and blade motion are along the same axis.

Figure 10:
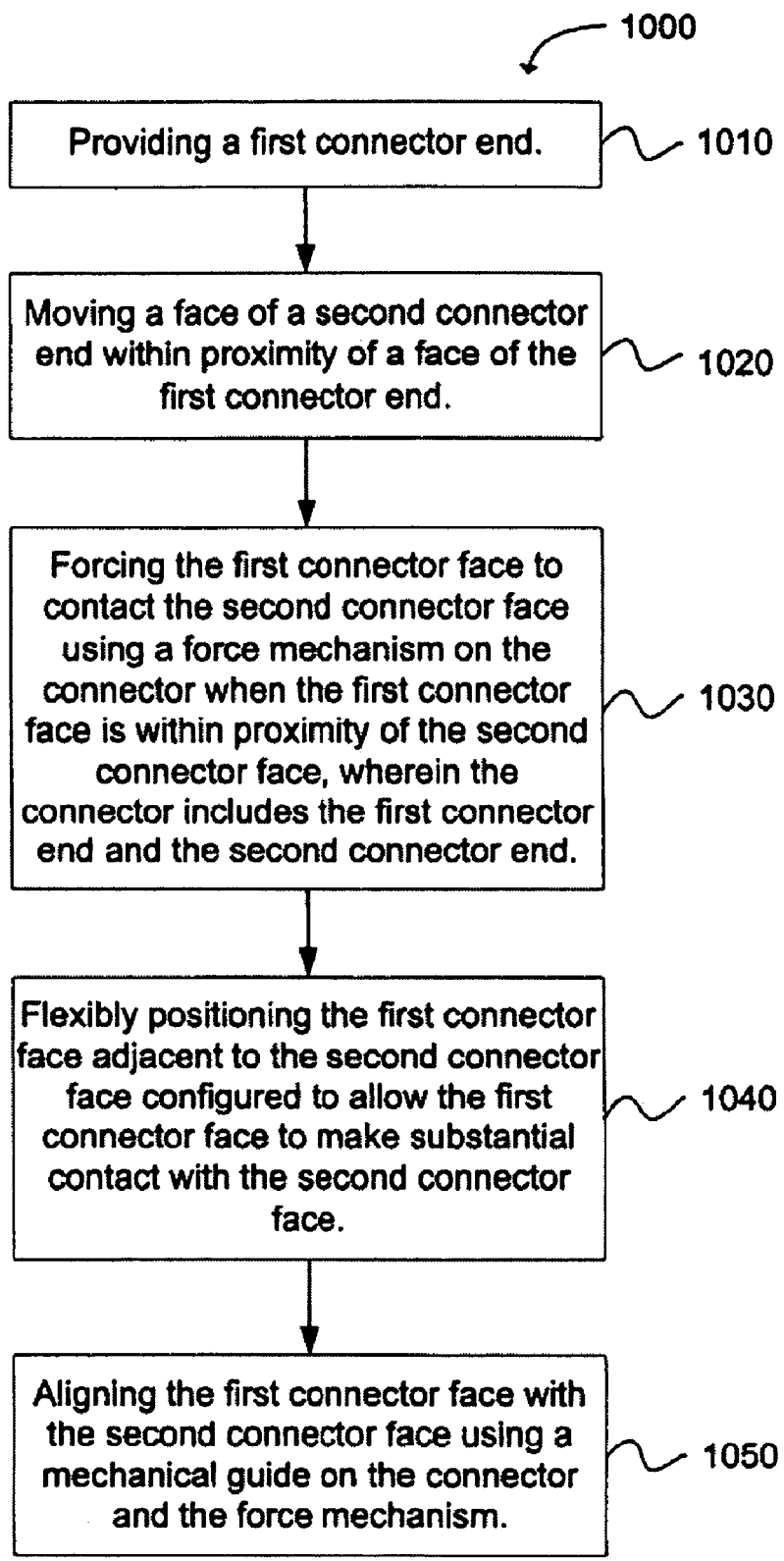
FIG. 10 is a flow chart illustrating a method for connecting an electro-optical connector with a proximity force mechanism and mechanical guides in accordance with an embodiment.

Another embodiment provides a method 1000 for connecting an electro-optical connector with a proximity force mechanism and mechanical guides, as shown in the flow chart in FIG. 10. The method includes the operation of providing 1010 a first connector end. The operation of moving 1020 a face of a second connector end within proximity of a face of the first connector end follows. The next operation of the method may be forcing 1030 the first connector face to contact the second connector face having a force mechanism on the connector when the first connector face is within proximity of the second connector face. The connector includes the first connector end and the second connector end.

The method 1000 further includes flexibly positioning 1040 the first connector face to the second connector face with the first or the second connector end flexibly coupled to a electro-optical device configured to allow the first connector face to make substantial contact with the second connector face. The locale specific string is on the locale specific resource file. Then, the operation of aligning 1050 the first connector face with the second connector face using a mechanical guide on the connector and the force mechanism can be performed.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An electro-optical connector, comprising:
   a first connector end coupled to a first electro-optical device;
   a second connector end coupled to a second electro-optical device;
   a second connector base coupled to the second connector end, said second connector base being supported on a substrate by a flexible mechanism configured for a second connector face to move flexibly with respect to a first connector face, wherein said flexible mechanism allows lateral, rotational and tilt movement of said second connector face relative to said first connector face to provide alignment of said first and second connector faces;
   a force mechanism on a connector end that applies a force on an interface between the first connector end and the second connector end when the first connector face is within a predefined proximity of the second connector face, wherein the connector end is the first connector end or the second connector end; and
   a mechanical guide on the connector end configured to align the first connector face with the second connector face when the force mechanism applies the force.

2. An electro-optical connector as in claim 1, wherein the force mechanism includes a magnet.

3. An electro-optical connector as in claim 1, wherein the force mechanism comprises an air spring.

4. An electro-optical connector as in claim 1, wherein the force mechanism and the flexible coupling of the second connector end of the second connector base are combined into a compliance mechanism.

5. An electro-optical connector as in claim 1, wherein the flexible mechanism includes a leaf spring.

6. An electro-optical connector as in claim 1, wherein the first connector end is compliantly coupled to a first connector base.

7. An electro-optical connector as in claim 1, wherein the mechanical guide further comprises at least two mechanical guides to provide rotation alignment on an interface plane of the first and the second connector faces.

8. An electro-optical connector as in claim 1, wherein the mechanical guide comprises a rough alignment guide and a fine alignment guide.

9. An electro-optical connector as in claim 1, wherein the mechanical guide comprises a spherical structure on one face of the connector and a corresponding taper on the other face of the connector.

10. An electro-optical connector as in claim 1, wherein the mechanical guide comprises a rod on one face of the connector and a corresponding cone-shaped taper on the other face of the connector, wherein the cone-shaped taper guides a tip of the rod to a point of the cone for alignment.

11. An electro-optical connector as in claim 1, wherein the mechanical guide comprises at least three datums on two sides of a first connector face to align the corresponding edges of second connector face, wherein two datums are on a first side of the first connector face and one datum is on a second side of the first connector face.

12. An electro-optical connector as in claim 1, wherein the first and the second electro-optical devices include integrated circuits (ICs).

13. An electro-optical connector, comprising:
   a first substrate;
   a second substrate substantially parallel to the first substrate;
   a first connector end attached to the first substrate;
   a second connector end attached to the second substrate, the second connector end being supported on the second substrate by a flexible mechanism having a folded, Z-shaped structure configured to enable lateral, rotational and tilt movement of a plane of a second connector face of the second connector end to align the second connector face with a first connector face of the first connector end;
   a force mechanism on the connector that applies a force on an interface of the first connector face and the second connector face when the first connector face is within proximity of the second connector face, wherein the connector includes the first connector end and the second connector end; and
   a mechanical guide on the connector configured to align the first connector face with the second connector face with the applied force.

14. An electro-optical connector as in claim 13, wherein the force mechanism applies a force orthogonal to the plane of the first substrate and the second substrate.

15. An electro-optical connector as in claim 13, wherein the first substrate or the second substrate comprises a printed circuit board (PCB).

16. An electro-optical connector as in claim 13, wherein the first substrate and second substrate comprise printed circuit board (PCB) computer card blades attached to a computer chassis.

17. An electro-optical connector as in claim 16, wherein the first connector face is within proximity of the second connector face when the PCB blades are attached to a computer chassis.

18. An electro-optical connector as in claim 17, wherein the first and the second connector ends detach from each other with a lateral force on the first and the second connector ends substantially parallel to the plane of the first substrate and the second substrate.

19. An electro-optical connector as in claim 13, wherein the second connector end is flexibly coupled to the second substrate with a flexible coupling, wherein the flexible coupling is configured to align the first connector face with the second connector face with a tilt and rotation of less than or equal to 5 degrees in all three axes of rotation.

20. A method for connecting an electro-optical connector with a proximity force mechanism and mechanical guides, comprising:
providing a first connector end;
moving a face of a second connector end within proximity of a face of the first connector end;
forcing the first connector face to contact the second connector face using a force mechanism on a connector when the first connector face is within proximity of the second connector face, wherein the connector includes the first connector end and the second connector end;
flexibly positioning the first connector face adjacent to the second connector face by supporting the first connector end on a flexible mechanism that allows lateral, rotational and tilt movement of the first connector end to allow the first connector face to align with the second connector face, wherein the flexible mechanism comprises electrical traces for carrying electrical data signals to said first connector end; and
further aligning the first connector face with the second connector face using a mechanical guide on the connector and the force mechanism.

21. An electro-optical connector as in claim 1, wherein said flexible mechanism comprises a folded, Z-shaped structure.

* * * * *